(12) United States Patent
Deluga

(10) Patent No.: US 7,403,377 B2
(45) Date of Patent: Jul. 22, 2008

(54) METHOD OF MANUFACTURE AND AN ENCLOSURE FOR A DISPLAY FOR AN ELECTRONIC DEVICE

(75) Inventor: Ronald E. Deluga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 11/039,320

(22) Filed: Jan. 20, 2005

(65) Prior Publication Data

US 2006/0158839 A1 Jul. 20, 2006

(51) Int. Cl.
*G06F 1/16* (2006.01)
(52) U.S. Cl. ........................ 361/683; 361/681
(58) Field of Classification Search ................. 361/683, 361/681; 312/223.1, 223.2
See application file for complete search history.

(56) References Cited

U.S. PATENT DOCUMENTS

| | | | | |
|---|---|---|---|---|
| 4,769,634 A * | 9/1988 | Killian et al. | ............... | 361/682 |
| 5,036,313 A * | 7/1991 | Lin et al. | .................... | 361/683 |
| 5,422,751 A * | 6/1995 | Lewis et al. | ................... | 349/59 |
| 5,703,665 A | 12/1997 | Muramatsu et al. | | |
| 5,721,404 A | 2/1998 | Toedtman | | |
| 5,801,919 A * | 9/1998 | Griencewic | ................ | 361/683 |
| 6,002,582 A * | 12/1999 | Yeager et al. | ............... | 361/681 |
| 6,049,450 A * | 4/2000 | Cho et al. | .................... | 361/683 |
| 6,064,565 A * | 5/2000 | Ishihara et al. | .............. | 361/681 |
| 6,202,256 B1 * | 3/2001 | Bovio et al. | ................. | 361/681 |
| 6,212,067 B1 * | 4/2001 | Nakajima et al. | ........... | 361/681 |
| 6,272,006 B1 * | 8/2001 | Lee | ............................. | 361/681 |
| 6,327,141 B2 * | 12/2001 | Kim | ........................... | 361/681 |
| 6,388,872 B1 * | 5/2002 | Liao et al. | ................... | 361/683 |
| 6,411,501 B1 * | 6/2002 | Cho et al. | .................... | 361/681 |
| 6,421,231 B1 * | 7/2002 | Jung | ......................... | 361/681 |
| 6,462,803 B2 | 10/2002 | Kumagai et al. | | |
| 6,525,789 B1 * | 2/2003 | Lee | ............................. | 349/58 |
| 6,525,790 B1 * | 2/2003 | Kan-o | ........................ | 361/681 |
| 6,525,927 B1 | 2/2003 | Sugai et al. | | |
| 6,564,429 B2 * | 5/2003 | Bovio et al. | ................. | 361/681 |
| 6,636,282 B2 | 10/2003 | Ogawa et al. | | |
| 6,646,865 B2 | 11/2003 | Huang et al. | | |
| 6,717,801 B1 * | 4/2004 | Castell et al. | ............... | 361/683 |
| RE38,516 E | 5/2004 | Hasegawa et al. | | |
| 6,765,790 B2 | 7/2004 | Lam et al. | | |
| 6,771,490 B2 | 8/2004 | Peker et al. | | |
| 6,785,128 B1 | 8/2004 | Yun | | |
| 6,853,336 B2 * | 2/2005 | Asano et al. | ................ | 361/683 |
| 6,989,986 B2 * | 1/2006 | Kumagai et al. | ............ | 361/681 |
| 6,992,884 B2 * | 1/2006 | Minaguchi et al. | .......... | 361/683 |
| 2006/0023407 A1 * | 2/2006 | Ling | .......................... | 361/683 |

* cited by examiner

*Primary Examiner*—Lisa Lea-Edmonds

(57) ABSTRACT

An enclosure for a display for an electronic device is provided. The enclosure comprises a backing portion having a thickness and a surface, at least one side member positioned perpendicular to the surface of the backing portion along a portion of the perimeter of the backing portion, at least one stiffening member, perpendicular to the surface of the backing portion and parallel to at least a portion of a side member, and an opening defined at least in part by the at least one stiffening member, the opening adapted to receive a display panel.

22 Claims, 8 Drawing Sheets

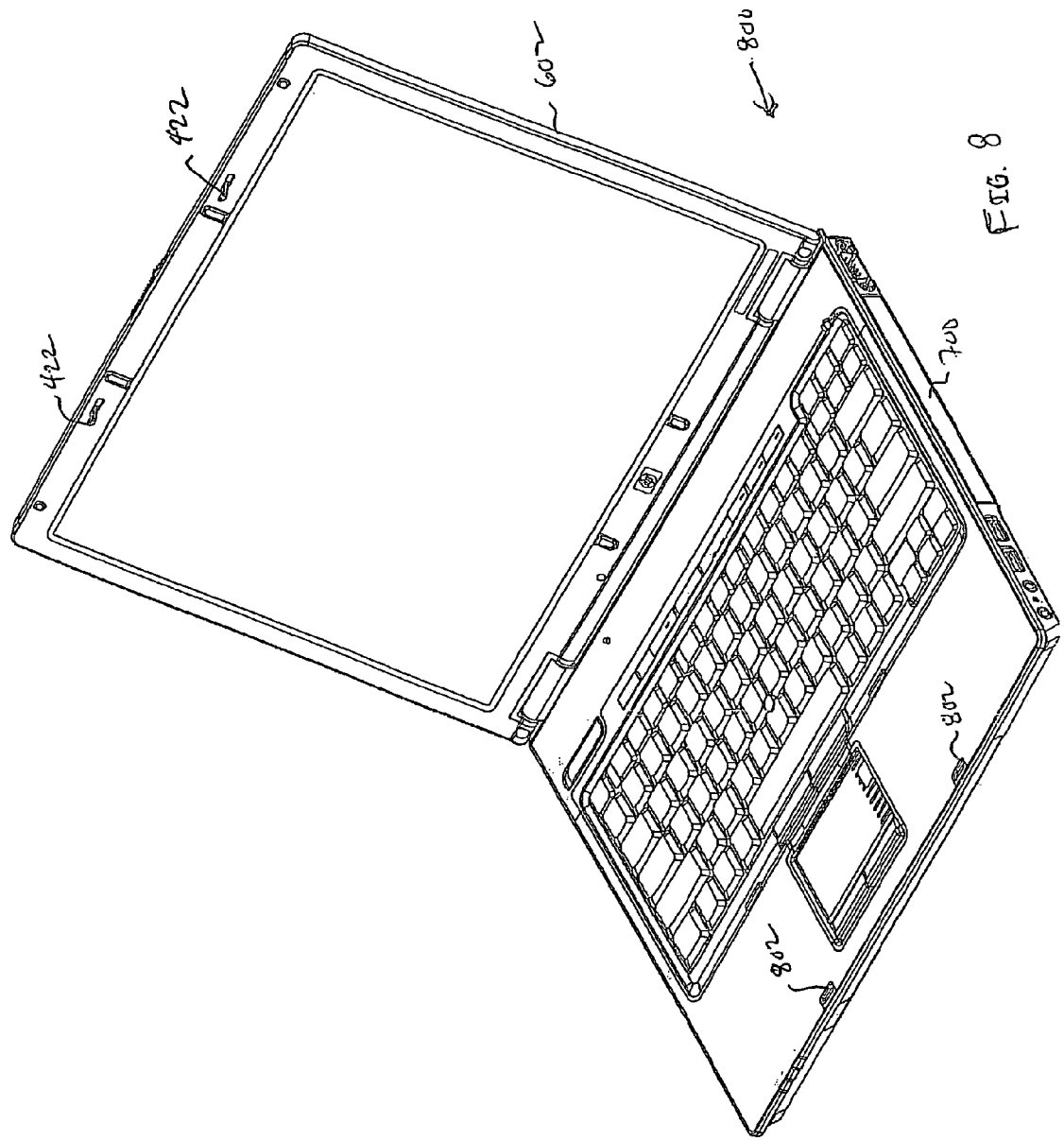

METHOD OF MANUFACTURE AND AN ENCLOSURE FOR A DISPLAY FOR AN ELECTRONIC DEVICE

BACKGROUND

Notebook computers have gained in popularity as manufacturers have produced products that offer a high degree of portability and processing power. A typical notebook computer comprises a built-in display that is connected to the main processing unit of the notebook through a hinge mechanism. With each successive generation of notebook computers, manufacturers continue to add more features to their product offerings. For example, over the years, manufacturers have added features such as built-in speakers, touch-pads, built-in cameras, larger capacity storage drives, new network interfaces, wireless interface cards and antennas. Some of these added features are built-in to the display portion of the notebook computer.

In existing systems, the display is typically built into an enclosure. The enclosure often comprises a sidewall that completely encircles a backing portion. A display panel is mounted in place within the enclosure and is fitted with a decorative bezel. As features are added to successive generations of products, portions of the sidewalls of the enclosure are often cut-out to accommodate new parts such as wireless antennas. This removal of portions of the sidewall weakens the enclosure.

In the past, manufacturers have dealt with this weakening of the enclosure in a number of different ways. For example, some systems have used additional brackets to help strengthen the enclosure. Other systems have made the enclosure thicker at an increase in material costs. In yet further systems, stronger materials have been substituted for weaker materials used in prior systems. Unfortunately, each of these approaches increases the cost of the newer system.

BRIEF DESCRIPTION OF THE DRAWINGS

FIG. 8 is a perspective view of one embodiment of a notebook computer including the main unit of FIG. 7 and the enclosure of FIG. 1.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
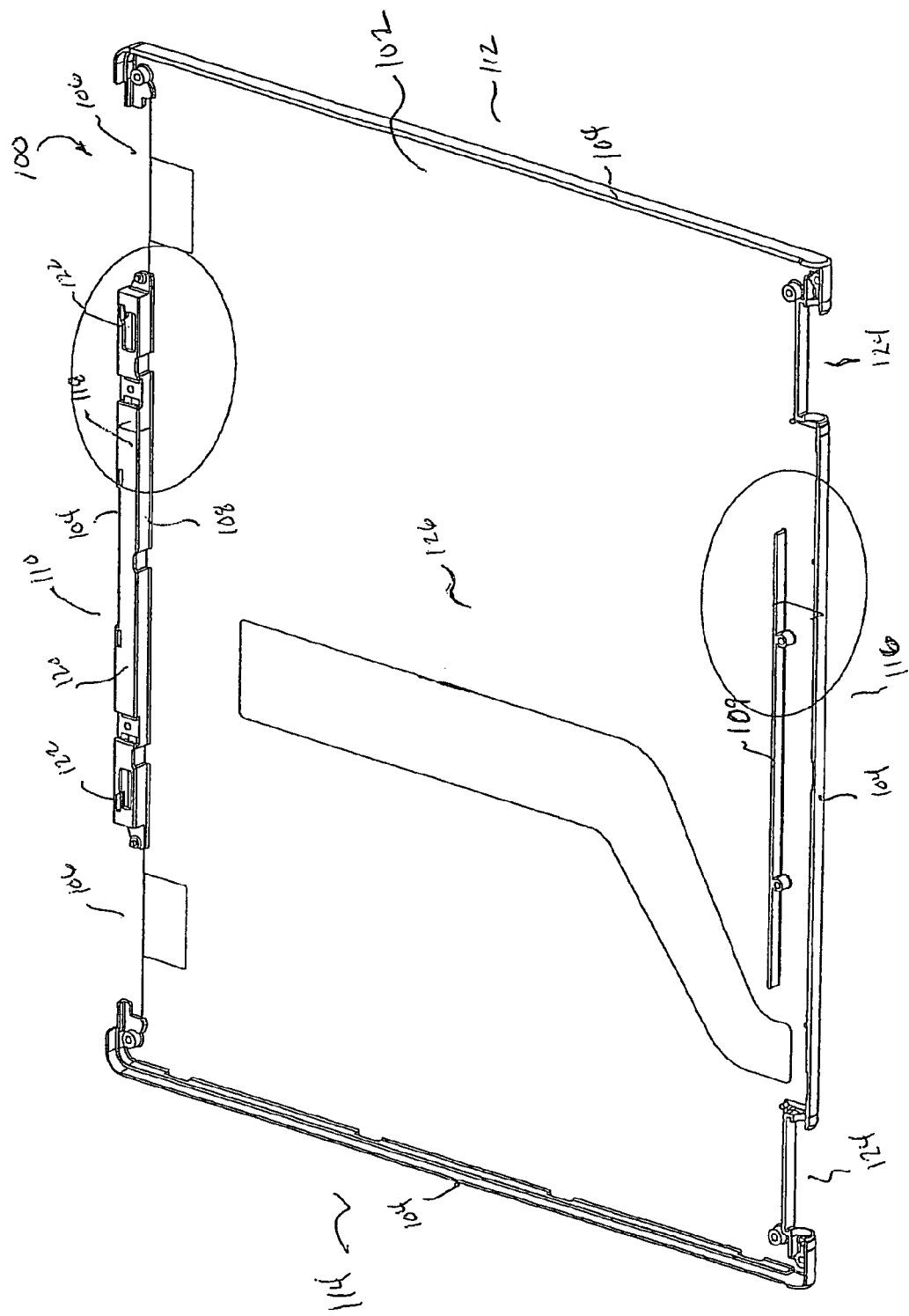
FIG. 1 is a perspective view of one embodiment of an enclosure for a display with improved stiffness according to the teachings of the present invention.
Figure 2:
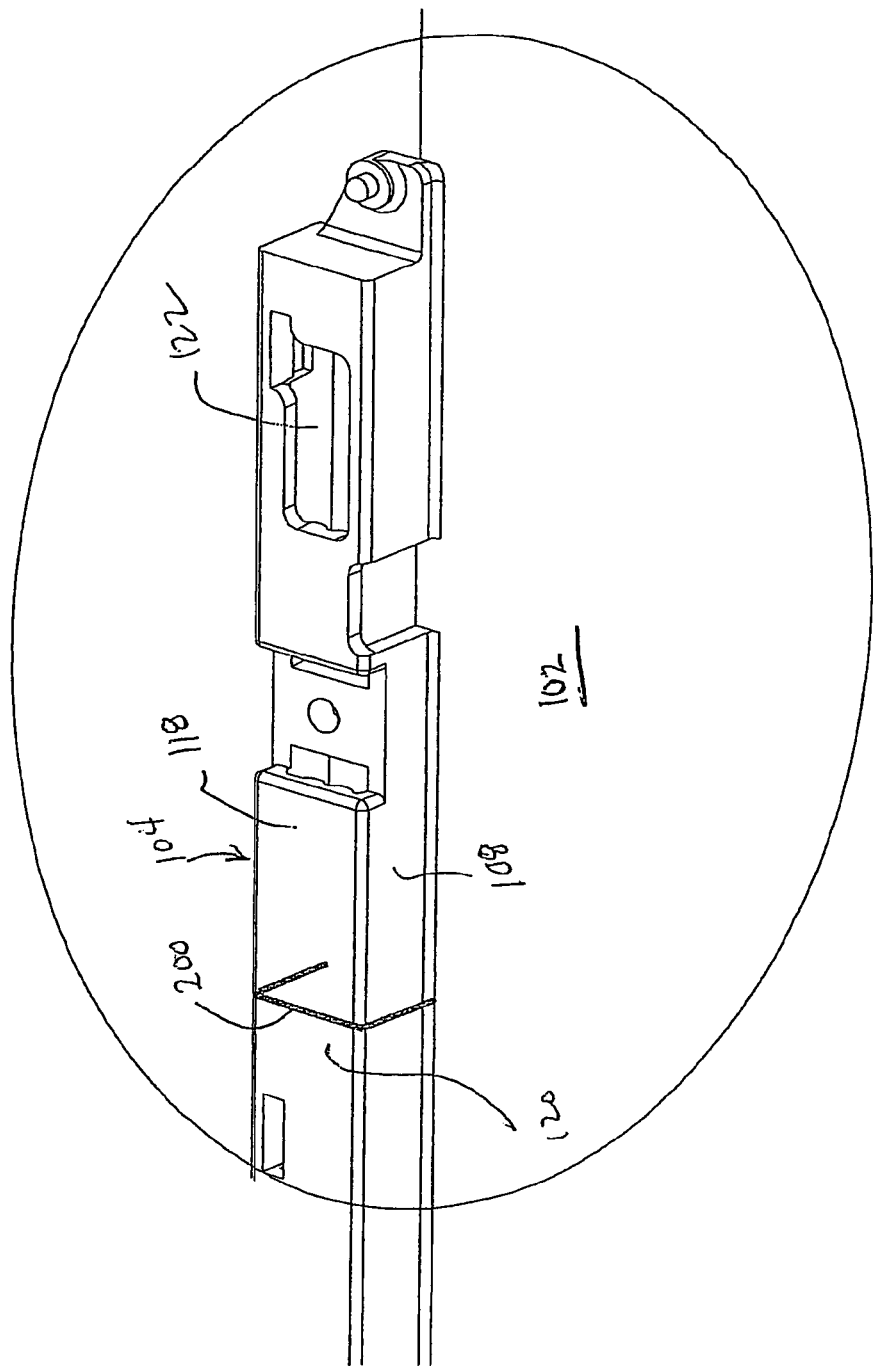
FIG. 2 is a perspective view of a portion of the enclosure of FIG. 1.
Figure 3:
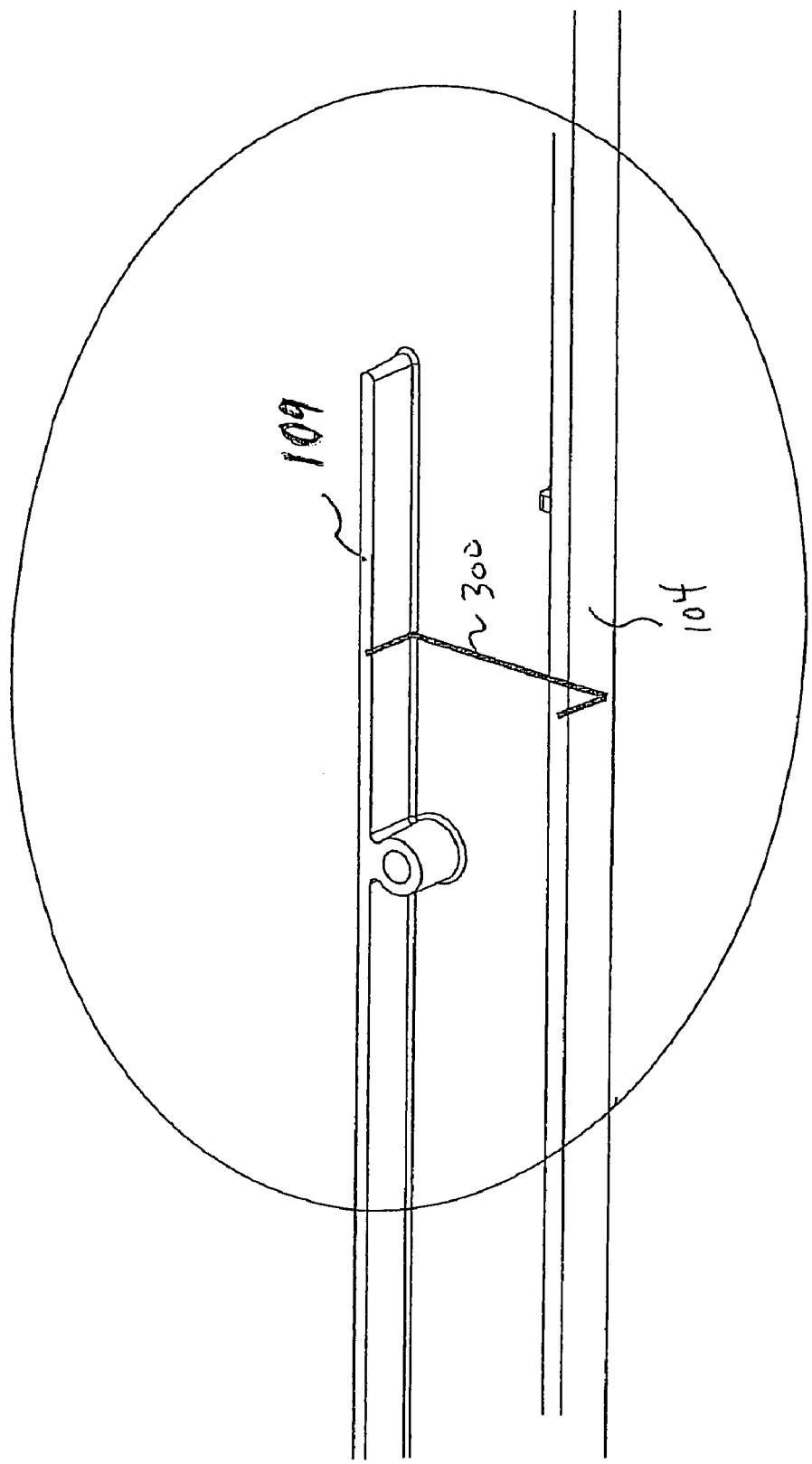
FIG. 3 is a perspective view of another portion of the enclosure of FIG. 1.

Embodiments of the present invention address problems in the design of enclosures for display panels for electronic equipment, e.g., notebook computers, tablet computers, and other electronic equipment with displays, through use of stiffening members to improve the strength of the enclosure. FIGS. 1-3 illustrate an embodiment of an enclosure with stiffening members according to the teachings of the present invention. FIGS. 4-8 illustrate one embodiment of a method for assembling a notebook computer that comprises an enclosure with stiffening members that improve the stiffness of the enclosure for the display of the notebook computer.

FIG. 1 is a perspective view of one embodiment of an enclosure, indicated generally at 100, for a display with improved stiffness for an electronic device according to the teachings of the present invention. Enclosure 100 comprises a backing portion 102 that covers the backside of the display, display assembly and/or display panel. In one embodiment, backing portion 102 comprises a layer of material, e.g., plastic. In other embodiments, backing portion 102 comprises a layer of die-cast magnesium or other metal. Backing portion 102 is partially edged by sidewall 104. Sidewall 104 is positioned perpendicular to the surface of backing portion 102 and along a portion of the perimeter of the backing portion 102. For purposes of this specification, the term perpendicular means surfaces that are formed at, or substantially at, right angles to each other. Sidewall 104 has a number of cut-outs or openings 106 that are situated to accommodate or accept other potential elements or components of the electronic device, e.g., antennas for a wireless network interface card. Cut-outs 106 divide sidewall 104 into a plurality of sidewall members. The cut-outs 106 reduce the overall stiffness of enclosure 100. To compensate for this, enclosure 100 comprises stiffening members 108 and 109.

Stiffening member 108 is disposed along a portion of an edge 110 of backing portion 102 to improve the overall stiffness of enclosure 100. Stiffening member 108 is positioned along edge 110 of backing portion 102 between cut-outs 106. Stiffening member 108 extends perpendicular to a surface of backing portion 102 of enclosure 100. Stiffening member 108 has a height that is substantially the same as the height of sidewall 104. Stiffening member 108 is parallel to, and lies inside of, at least a portion of sidewall 104. For purposes of this specification, the term parallel means surfaces that are equidistant, or substantially equidistant, from each other. In one embodiment, stiffening member 108 is also proximate or near to at least a portion of sidewall 104. In the illustrated embodiments, stiffening member 108 is coupled to sidewall 104 by connecting member 118 so as to have an inverted U-shape cross-section as indicated in FIG. 2 at 200. For purposes of this specification, the term "U-shaped" includes other shapes that are substantially similar to the U-shape shown in FIG. 2 and in FIG. 3 (discussed below).

For purposes of this specification, the term integral means that elements identified as being integral are formed as a single unit with each other. Returning to FIG. 1, in one embodiment, sidewall 104, stiffening members 108 and 109, connecting member 118 and backing portion 102 of enclosure 100 are fabricated as an integral unit using a die-cast process with an appropriate material, e.g., plastic, magnesium or other appropriate metal. In other embodiments, backing portion 102 and at least one of stiffening members 108 and 109 are formed as an integral structure. Advantageously, stiffening members do not add any appreciable cost to the construction of enclosure 100 when a die-cast process is used because the stiffening mechanism is formed in the same process that forms the rest of the enclosure 100 and with little, if any, added material cost.

Figure 4:
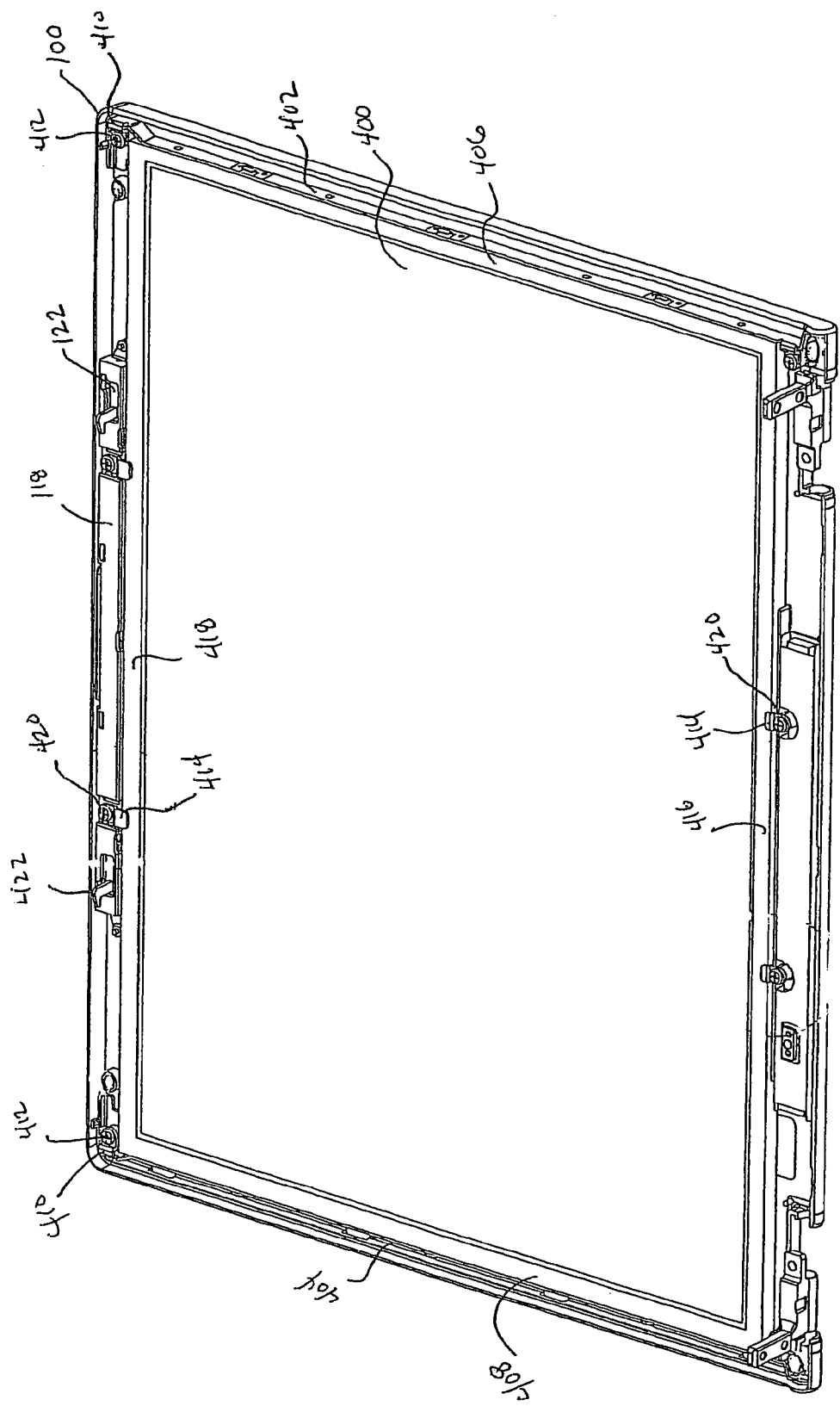
FIG. 4 is a perspective view of an embodiment of the enclosure of FIG. 1 with a display panel inserted in an opening of the enclosure.
Figure 5:
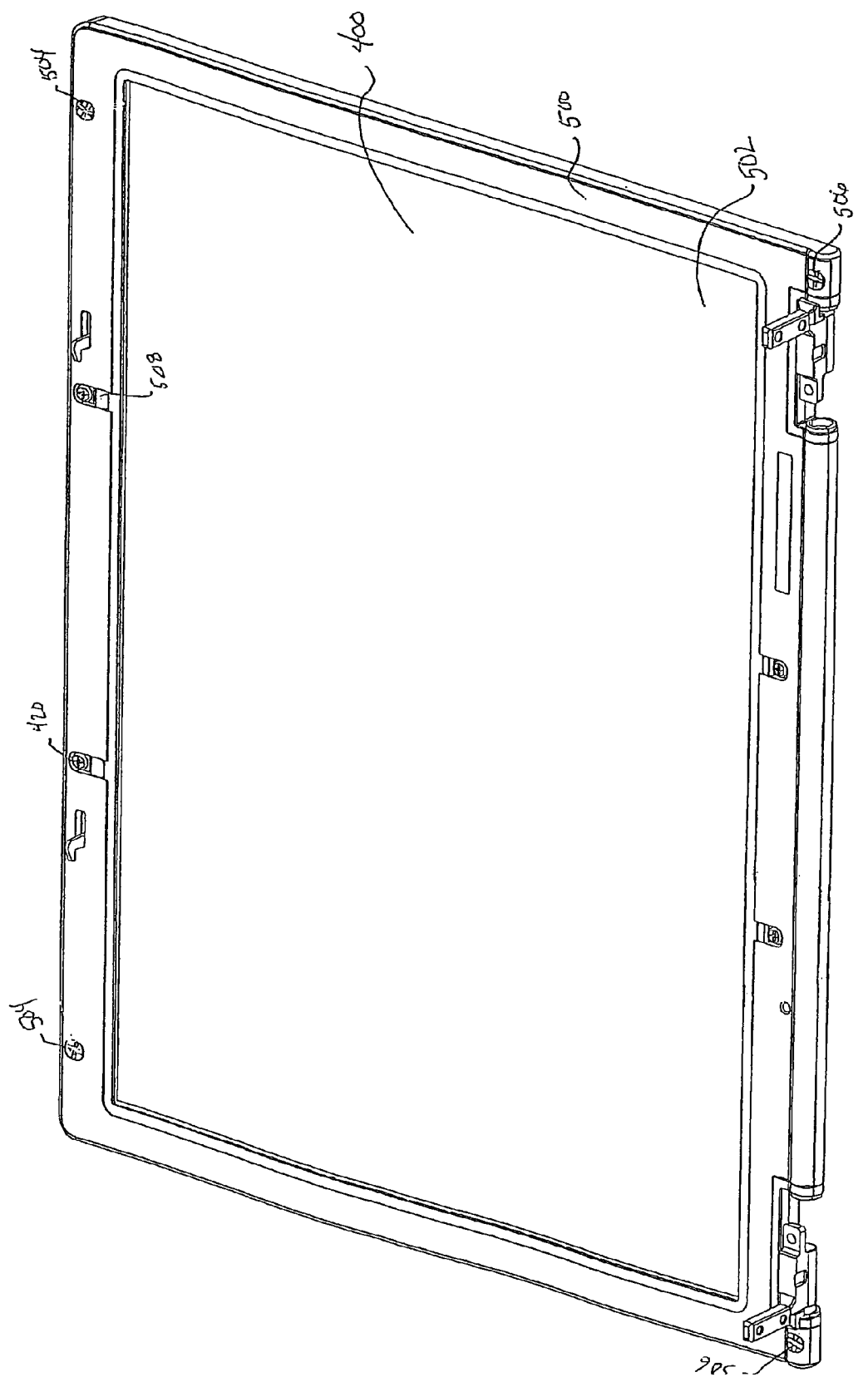
FIGS. 5 and 6 are perspective views of an embodiment of the enclosure of FIG. 4 with the addition of one embodiment of a bezel surrounding the display panel.
Figure 6:
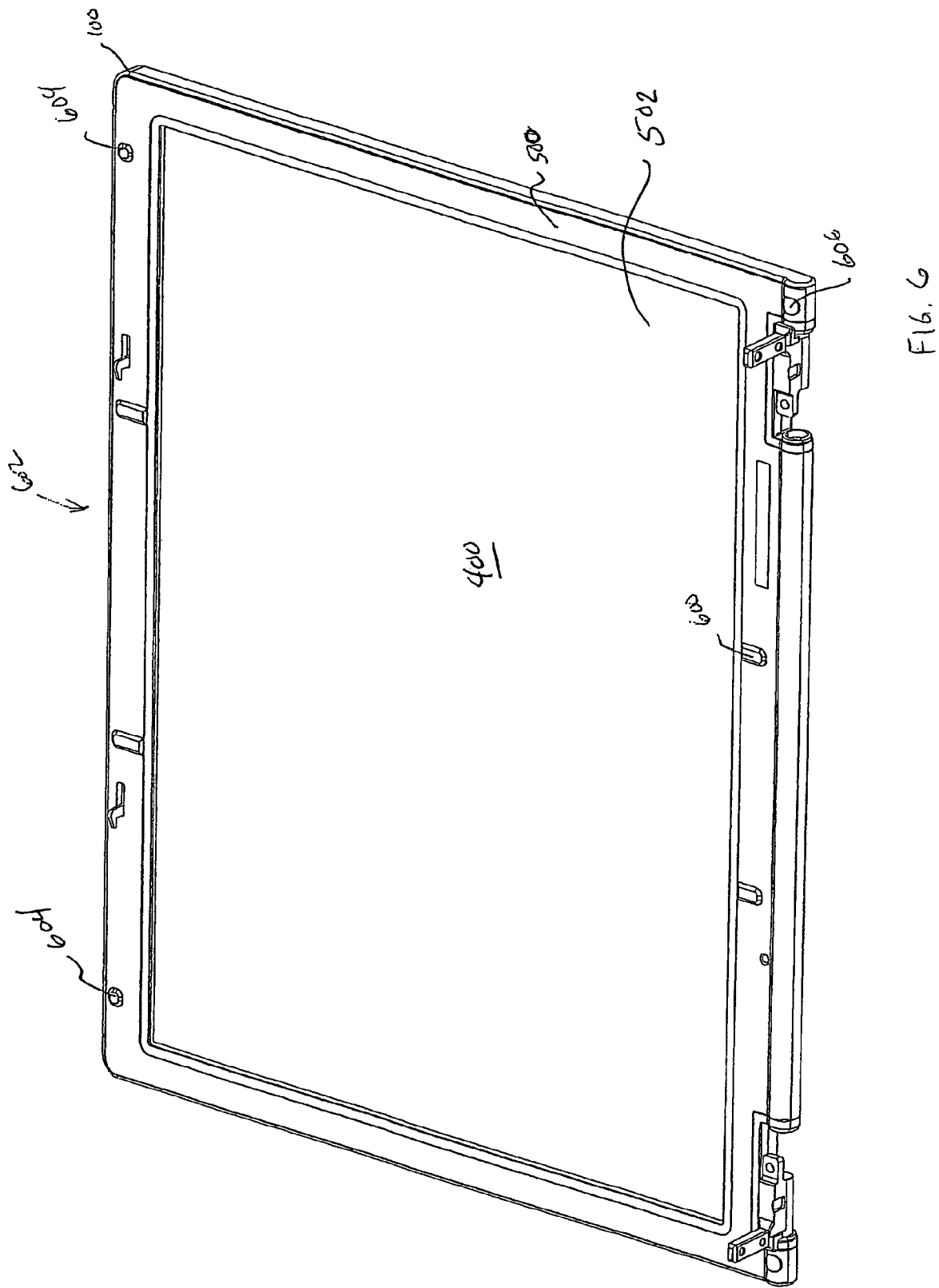

In one embodiment, stiffening member 108, connecting member 118 and sidewall 104 form a channel for housing a latching mechanism (see, e.g., FIGS. 4-6). Openings 122 are formed in connecting member 118 to enable a portion of the latching mechanism to extend out of channel 120 to engage the computer when the display is in a closed position.

Stiffening member 109 is disposed along edge 116 of backing portion 102. Stiffening member 109 is formed parallel to sidewall 104 of backing portion 102. The illustrated embodiment shows stiffening member 109 located between hinge openings 124 in sidewall 104 along edge 116. Stiffening member 109 is perpendicular to a surface of backing portion 102. In one embodiment, stiffening member 109 is also proximate or near to at least a portion of sidewall 104. As shown in FIG. 3, stiffening member 109 forms a U-shaped cross-section with a connecting portion of backing portion 102 and sidewall 104 as indicated at 300. Stiffening member 109 has a height that is substantially equal to the height of sidewall 104.

Returning again to FIG. 1, enclosure 100 has an opening 126 that is adapted to receive a display panel (see FIGS. 4-6). A boundary of opening 126 is defined by stiffening members 108, 109 and portions of sidewall 104 along edges 112 and 114 of backing portion 102.

In some embodiments, enclosure 100 comprises only one of stiffening members 108 and 109. In other embodiments, stiffening members 108 and 109 are located parallel to different edges of enclosure 100. Further, in other embodiments, enclosure 100 also comprises any other appropriate number of stiffening members.

FIGS. 4-8 illustrate one embodiment of a process for assembling a notebook computer that comprises an enclosure with stiffening members such as enclosure 100 of FIG. 1. In FIG. 4, a display panel 400 is placed in opening 126 of enclosure 100. In one embodiment, display panel 400 comprises a liquid crystal display (LCD) or other appropriate display panel for a portable computer. Display panel 400 is held in place by brackets 402 and 404 disposed on edges 406 and 408 of display panel 400.

Display panel 400 is secured in enclosure 100 using a number of fastening members. Clips or tabs 410 are secured to enclosure 100 using fasteners 412, e.g., screws, snap connectors. Clips 410 engage brackets 402 and 404 at respective corners of display 400. Additional clips or tabs 414 also secure display panel 400 in place along edges 416 and 418 of display panel 400, respectively. Clips 414 are secured to enclosure 100 using fasteners 420, e.g., screws, snap connectors.

Latching members 422 extend from openings 122 in connecting member 118. Latching members 422 are adapted to slide back and forth in openings 122, normally under user control. The operation of latching members 422 is discussed in more detail below with respect to FIG. 8. Latching members 422 are used to maintain the display of an electronic device in a closed, or fixed position.

As shown in FIG. 5, a decorative bezel 500 is attached to enclosure 100. Bezel 500 comprises an opening 502 to expose the viewable portion of display panel 400. Bezel 500 is attached to enclosure 100, in one embodiment, using fasteners 504 and 506, e.g., screws or snap posts. Bezel 500 also has openings 508 that expose screws 420. As shown in FIG. 6, openings 508 are closed with covers 600, e.g., rubber covers.

Further, screws 504 and 506 are also covered with covers 604 and 606, respectively, e.g., rubber covers. The completed structure shown in FIG. 6 comprises a display assembly 602 and is ready for connection to a main or base unit to complete the electronic device, e.g., a notebook computer.

Figure 7:
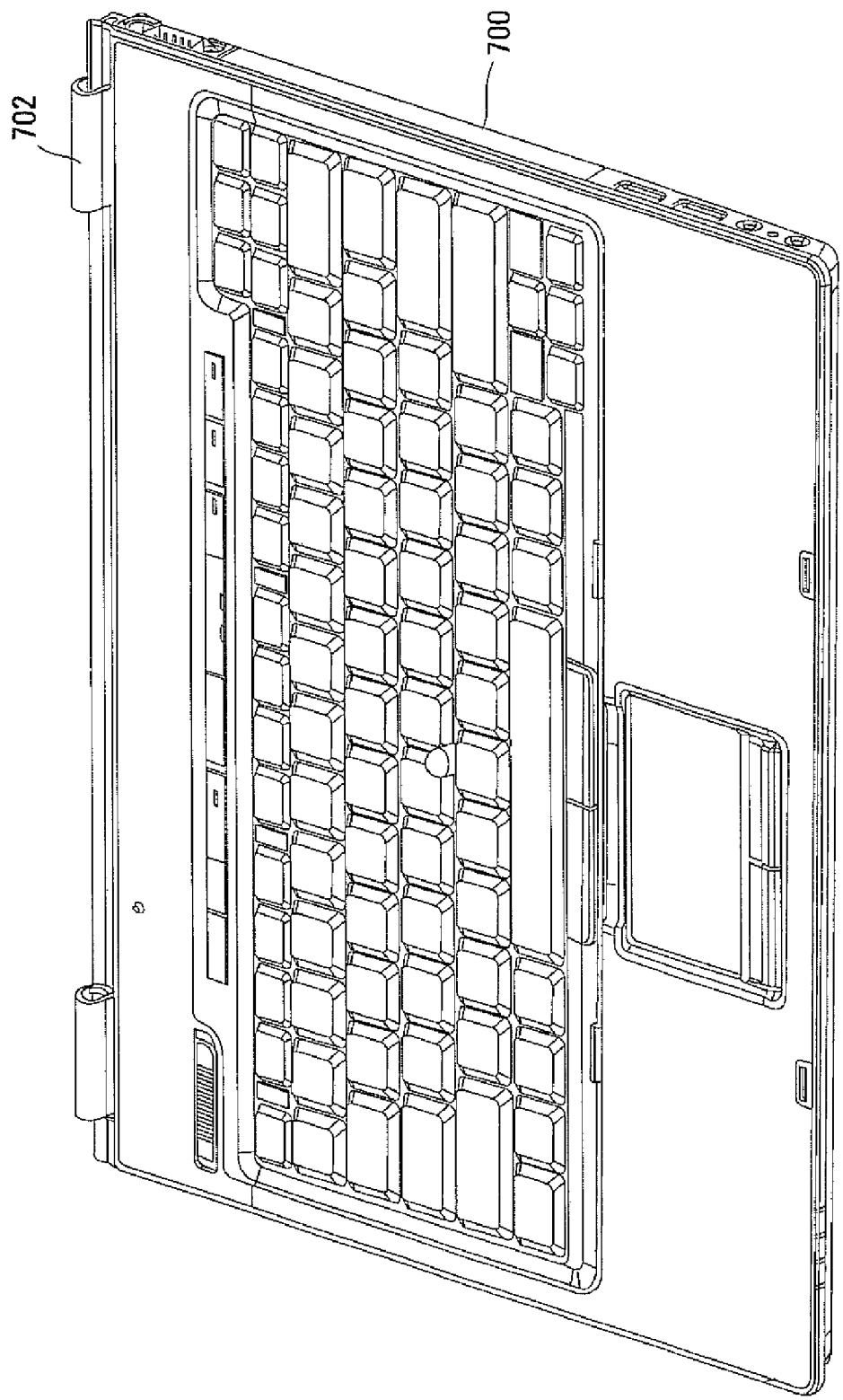
FIG. 7 is a perspective view of an embodiment of a main unit of a notebook computer for use with the enclosure of FIG. 1.

FIG. 7 is a perspective view of an embodiment of a main unit, 700, of an electronic device, e.g., a notebook computer, for use with, for example, the display assembly 602 of FIG. 6. In one embodiment, the main unit 700 comprises a processor, memory, at least one disk drive, a keyboard, connectors and other components used in the operation of the notebook computer. Unit 700 also comprises hinge connectors 702 that provide mechanical and electrical connection between unit 700 and display assembly 602.

FIG. 8 is a perspective view of one embodiment of a notebook computer, indicated generally at 800, including the main unit 700 of FIG. 7 and the display assembly 602 of FIG. 6. As shown in FIG. 8, the display assembly 602 is hingedly coupled to unit 700 to complete the notebook computer 800. When display assembly 602 is closed, latching members 422 engage slots 802 in main unit 700 to secure notebook computer 800 in a closed position.

What is claimed is:

1. An enclosure for a display for an electronic device, the enclosure comprising:
   a backing portion having a thickness and a surface;
   at least one side member positioned perpendicular to the surface of the backing portion along a portion of the perimeter of the backing portion;
   at least one non-conductive, elongate stiffening member, perpendicular to the surface of the backing portion and parallel to and separated from at least a portion of a side member; and
   an opening defined at least in part by the at least one stiffening member, the opening adapted to receive a display panel.

2. The enclosure of claim 1, wherein the at least one stiffening member comprises a stiffening member that extends from the surface of the backing portion.

3. The enclosure of claim 1, wherein the at least one stiffening member is coupled to the side member by a member that is parallel with the surface of the backing portion.

4. The enclosure of claim 1, wherein the backing portion, the at least one side member and the at least one stiffening member comprise an integral structure.

5. The enclosure of claim 1, wherein the at least one stiffening member and the at least a portion of a side member have substantially the same depth.

6. The enclosure of claim 1, wherein the at least one stiffening member, the backing portion and the at least a portion of a side member form a U-shaped cross-section.

7. The enclosure of claim 1, wherein the at least one stiffening member, a connecting member and the at least a portion of a side member form an inverted U-shaped cross-section.

8. A display assembly for a computer, the display assembly comprising:
   a display panel;
   an enclosure comprising:
      an opening that is sized to receive the display panel,
      a backing portion,
      a sidewall that partially edges the backing portion,
      at least one elongate stiffening member parallel with at least a portion of the sidewall and positioned integral with, and perpendicular to, the backing portion to add stiffness to the backing portion; and
   a bezel disposed over the perimeter of the display panel and engaging the sidewall of the backing portion.

9. The display assembly of claim 8, wherein the at least one stiffening member comprises a stiffening member disposed on the backing portion and extending perpendicular to the backing portion and defining at least a portion of the opening for receiving the display panel.

10. The display assembly of claim 8, wherein the at least one stiffening member comprises a stiffening member disposed on the backing portion and extending perpendicular to the backing portion and connected to die sidewall by a connecting member that is parallel with the backing portion.

11. The display assembly of claim 10, wherein a latch is disposed in a channel formed between the stiffening member and the sidewall.

12. A method of manufacturing a display assembly, the method comprising:
 forming a backing portion with elongate, non-conductive stiffening members that are perpendicular to the backing portion and parallel to at least a portion of a sidewall, the sidewall partially edging the backing portion;
 mounting a display panel in an opening defined in part by the sidewall and in part by the stiffening members of the backing portion; and
 attaching a bezel around a perimeter of the display panel.

13. The method of claim 12, wherein forming the backing portion comprises forming the backing portion with the stiffening members in an integral assembly.

14. The method of claim 12, wherein forming a backing portion comprises forming a backing portion with first and second stiffening members disposed parallel to the sidewall on opposite edges of the backing portion.

15. The method of claim 12, wherein mounting the display panel comprises:
 placing the display panel in the opening; and
 connecting a number of tabs to hold the display panel in the opening.

16. A method of manufacturing an enclosure for a display of an electronic device, the method comprising:
 forming a backing portion;
 forming a sidewall that partially edges the backing portion along a periphery of the backing portion; and
 forming at least one non-conductive stiffening member, wherein the at least one stiffening member is disposed proximate to at least a portion of the sidewall and wherein the at least one stiffening member is parallel to and separated from the at least a portion of the sidewall and perpendicular to the backing portion.

17. The method of claim 16, wherein the backing portion, the sidewall, and the at least one stiffening member are formed in an integral structure.

18. The method of claim 16, wherein forming the at least one stiffening member comprises forming at least one stiffening member proximate to a portion of the sidewall that comprises hinge openings for the enclosure.

19. The method of claim 16, wherein forming the sidewall comprises forming the sidewall with openings for receiving at least one component.

20. An enclosure for a display of an electronic device, the enclosure comprising:
 means for covering a backside of the display;
 means for edging at least a portion of the means for covering;
 means, connected to the means for covering, for providing stiffness to the means for covering, the means for providing stiffness being parallel to, and separated from, a substantial portion of the means for edging and perpendicular to the means for covering.

21. The enclosure of claim 20, wherein the means for providing stiffness is integral with the means for covering.

22. The enclosure of claim 20, wherein the means for edging comprises means for accepting at least one component.

* * * * *

UNITED STATES PATENT AND TRADEMARK OFFICE
CERTIFICATE OF CORRECTION

PATENT NO. : 7,403,377 B2
APPLICATION NO. : 11/039320
DATED : July 22, 2008
INVENTOR(S) : Ronald E. Deluga It is certified that error appears in the above-identified patent and that said Letters Patent is hereby corrected as shown below:

In column 5, line 9, in Claim 10, after "to" delete "die" and insert -- the --, therefor.

Signed and Sealed this

Twenty-eighth Day of October, 2008

JON W. DUDAS
*Director of the United States Patent and Trademark Office*